Figure 7:
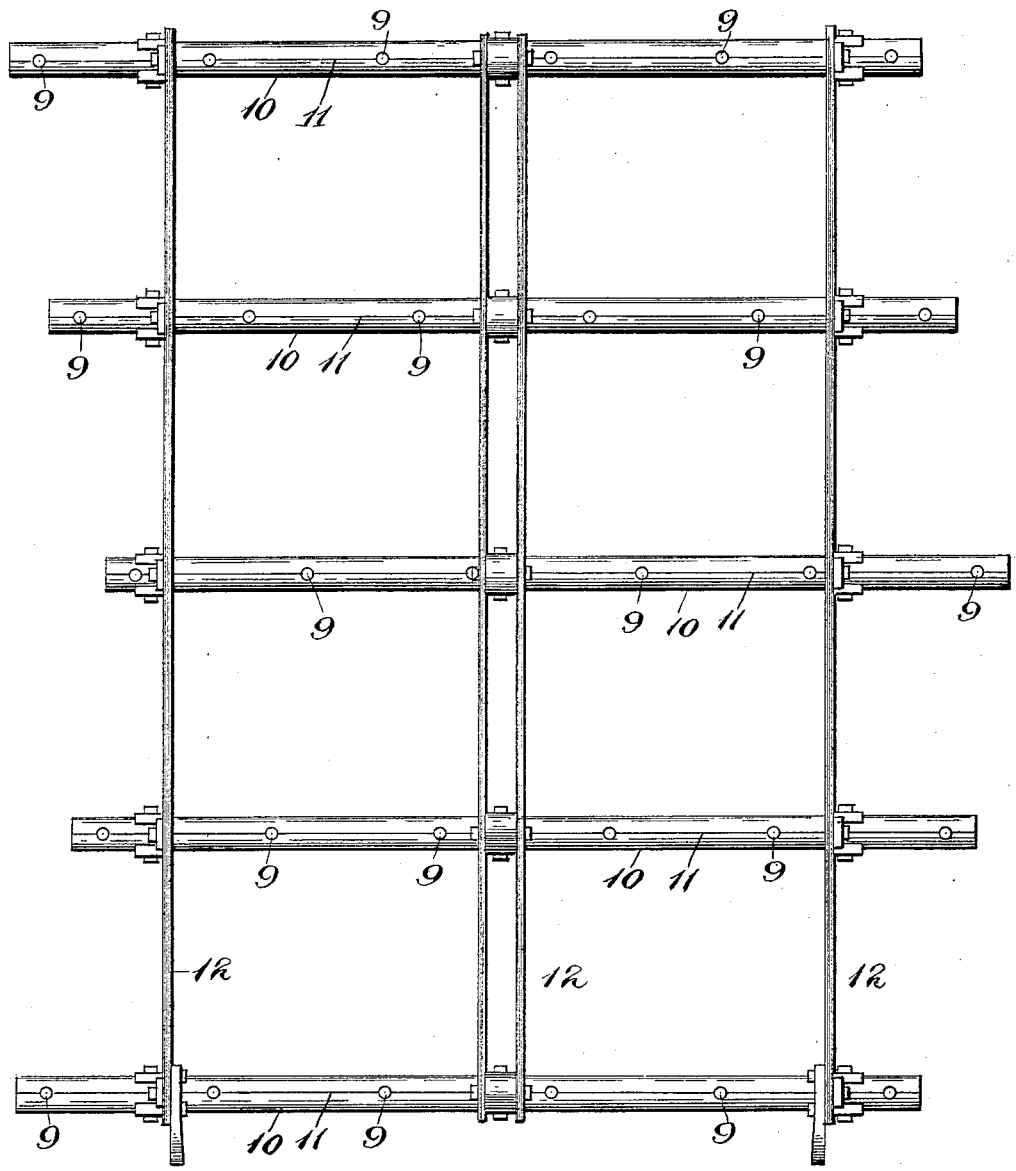

No. 631,046. Patented Aug. 15, 1899.
J. MACPHAIL.
JOINT.
(Application filed July 11, 1898.)
(No Model.) 2 Sheets—Sheet 1.
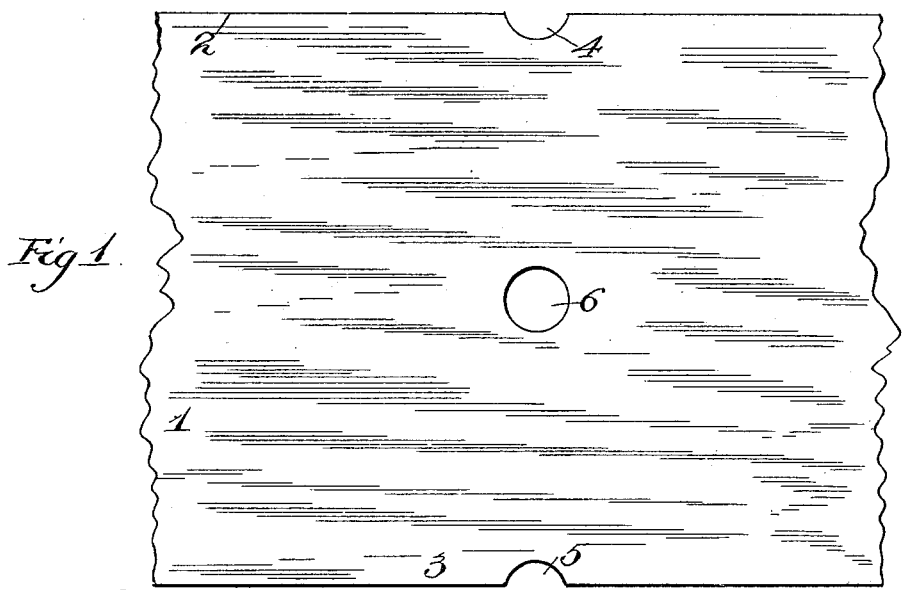
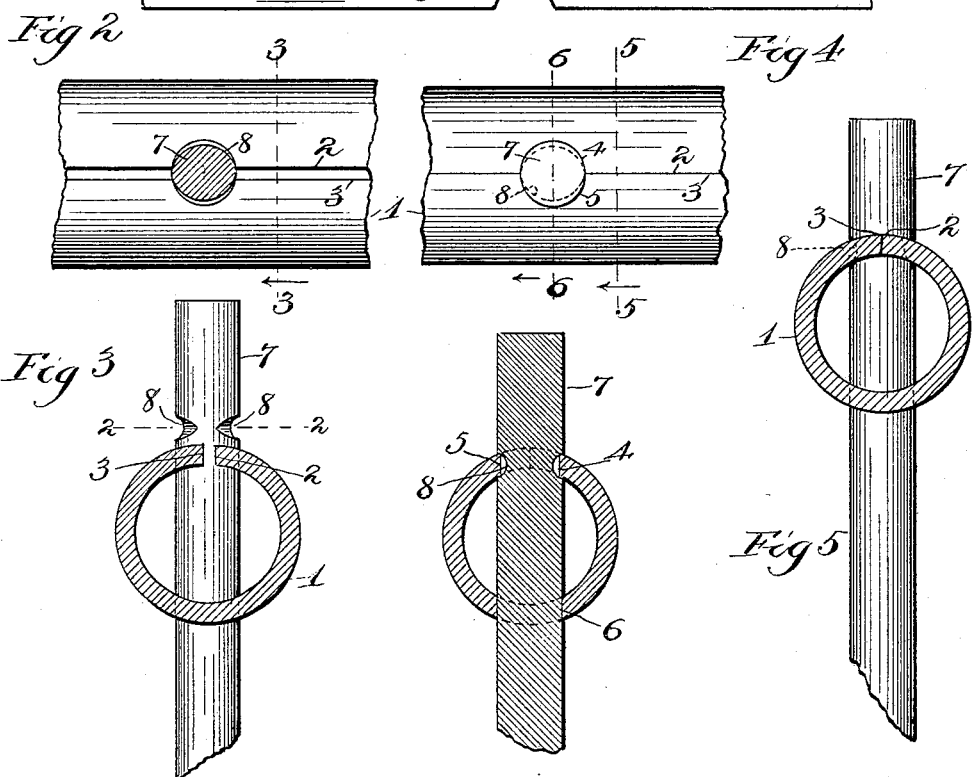
Witnesses
N. C. Corliss
Allan A. Murray
Inventor
James Macphail
By Coburn, Kibben & McElroy
Attys
THE NORRIS PETERS CO., PHOTO-LITHO., WASHINGTON, D. C.

No. 631,046. Patented Aug. 15, 1899.
J. MACPHAIL.
JOINT.
(Application filed July 11, 1898.)
(No Model.) 2 Sheets—Sheet 2.

Witnesses
W. C. Coolies
Allan A. Murray

Inventor
James Macphail
By Coburn, Hibbard & McElroy
Attys

UNITED STATES PATENT OFFICE.

JAMES MACPHAIL, OF BLUE ISLAND, ILLINOIS.

JOINT.

SPECIFICATION forming part of Letters Patent No. 631,046, dated August 15, 1899.

Application filed July 11, 1898. Serial No. 685,628. (No model.)

*To all whom it may concern:*

Be it known that I, JAMES MACPHAIL, residing at Blue Island, in the county of Cook and State of Illinois, have invented certain new and useful Improvements in Joints, of which the following is a specification.

The object of my invention is to provide a simple and efficient means whereby a joint or connection may be made directly between a bar or pipe and a rod of any shape without riveting or the use of screws, nuts, or bolts and the like.

In the accompanying drawings, Figure 1 represents a blank from which the pipe or tube is to be formed. Fig. 2 is a sectional plan on the line 2 2 of Fig. 3; Fig. 3, a sectional elevation on the line 3 3 of Fig. 2, looking in the direction of the arrow; Fig. 4, a plan view of either Fig. 5 or Fig. 6; Fig. 5, a sectional elevation on line 5 5 of Fig. 4, looking in the direction of the arrow; Fig. 6, a transverse section on line 6 6 of Fig. 4, looking in the direction of the arrow; and Fig. 7, a plan of a harrow, showing one practical application of my invention.

What I will term for convenience a "pipe" or "tube" is formed from a bar or blank 1 of any suitable resilient material, preferably of steel and of any dimensions that may be found desirable or necessary. The opposite edges 2 and 3 of the blanks are provided with marginal recesses 4 and 5, which are, as shown in the drawings, substantially semicircles to correspond with the particular shape of the rod to be inserted therein, which shape is selected for convenience and not with any intention of limitation. Midway of the sides of the blank and in the same transverse plane as the recesses a hole 6 is provided, preferably of the same contour as the rod to be attached or joined to the pipe or tube.

When the bar or blank 1 is bent to form a tube, the recesses come together to form an opening, preferably substantially of the same shape as the opening or hole in the middle portion of the blank, but preferably, though not necessarily, somewhat smaller than such latter hole or opening. The meeting edges 2 and 3 are brought together, but not joined, so that a tube with an open seam is formed, and the recesses and the hole 6 form an opening substantially transversely through such pipe or tube. The rod 7 may be of any suitable shape and dimensions, and while in the
drawings I have shown a round rod I do not intend to limit myself thereto, as it will be understood that the pipe can be made to accommodate any other size and shape of rod by the same manner of joint. It is also obvious that the size and shape of the hole in the blank as well as the recesses therein are variable to accord with that of the rod to be joined thereto. The rod is provided with grooves 8 (preferably two) upon opposite sides, although a single groove on one side only of the rod might be employed.

When the joint is to be made between the rod and pipe or tube formed as above described, the rod is inserted in the holes in the pipe and driven or forced therein. In order to accommodate the rod, which is preferably somewhat wider than the hole formed by the marginal recesses, the open seam springs apart, as clearly illustrated in Figs. 2 and 3, until the rod is driven or forced in up to the grooves 8, whereupon the edges of the pipe will spring back into the grooves, as seen in Figs. 4, 5, and 6, and securely lock the rod to the pipe without riveting or the use of any third members or devices whatsoever.

In the drawings I have shown my invention applied to a harrow having harrow-teeth 9, cross-bars 10, provided with seams 11, and the usual connecting-bars 12. The teeth and cross-bars are the prototypes or equivalents, respectively, of the rods and bars heretofore mentioned. However, such application of my invention to a harrow is not shown with any intention of in any wise limiting myself thereto, but simply as showing one of the many practical applications of my invention.

By the use of my invention I secure an efficient, simple, and practical joint between a rod and a pipe or other similar members, and I am enabled thereby to dispense with riveting or the use of screws, bolts, nuts, and other objectionable and expensive devices. Moreover, my joint may obviously be employed in many different places and to subserve many different purposes. For instance, my invention may be used in the manufacture of agricultural implements where it is necessary to secure a rod or tooth to a bar—such as in harrows, rakes, &c.—although the invention can find advantageous application elsewhere. Consequently I contemplate all the uses to which my invention is applicable.

While I have described the pipe or tube as formed from a bar or blank preliminarily provided with the holes and recesses, it is obvious that such pipe or tube may be formed or rolled from a plain blank and that the holes may afterward be formed therein. It is also obvious that many changes may be made in the form, proportion of parts, and that equivalents may be used without departing from the spirit and scope of my invention and claims.

I claim—

1. A joint comprising a pipe or tube having meeting unconnected edges forming an open seam and an opening or hole extending through the seam and a rod inserted in the hole and held therein by the resiliency of the pipe or tube.

2. A joint comprising a pipe or tube having meeting unconnected edges forming an open seam and an opening or hole extending through the seam and a rod having a groove or recess upon one of its faces and inserted in the hole and held therein by the resiliency of the pipe or tube.

3. A joint comprising a rod having a groove or recess upon one of its faces and a pipe having meeting unconnected edges forming an open seam and an opening or hole extending through the seam and of less width than the rod, such rod being inserted in the opening or hole and the recess being adapted to be engaged by the sides of the hole through the seam and held therein by the resiliency of the pipe or tube.

4. A joint comprising a pipe or tube having meeting unconnected edges forming an open seam and provided with a transverse opening passing through the seam and a rod inserted and held in the opening by the resiliency of the pipe or tube.

5. A joint comprising a pipe or tube having meeting unconnected edges forming an open seam and provided with a transverse opening passing through the seam and a rod of greater width than the opening through the seam whereby the pipe will spring apart but pinch the rod and hold the same.

6. A joint comprising a pipe or tube having meeting unconnected edges forming an open seam and provided with a transverse opening passing through the seam and a rod of greater width than the opening in the seam and having a groove or recess whereby as the rod is inserted in the opening in the pipe the seam will be sprung apart but such seam edges will engage in the groove to securely join the pipe and rod.

7. A joint comprising a pipe having meeting unconnected edges forming an open seam and provided with a transverse opening extending through the seam and a rod 7 having grooves 8 and inserted in said hole or opening, the seam being adapted to spring apart to admit the rod but to spring back into the grooves to engage and lock the rod.

JAMES MACPHAIL.

Witnesses:
ALLAN A. MURRAY,
SAMUEL E. HIBBEN.